S S. ECCLESTON.
PLANT SUPPORT.
APPLICATION FILED DEC. 7, 1917.
1,286,258.
Patented Dec. 3, 1918.
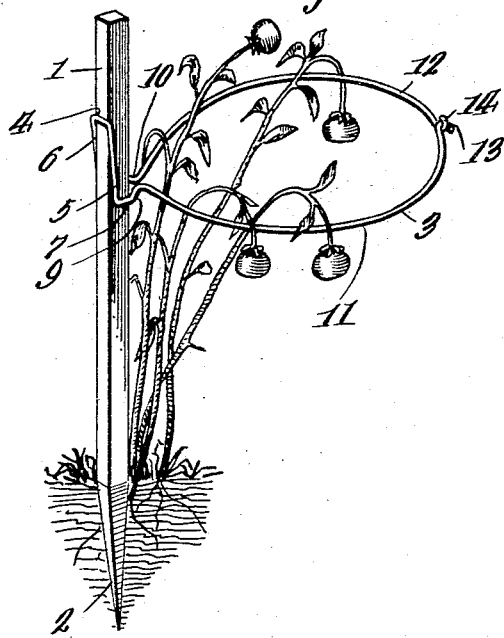
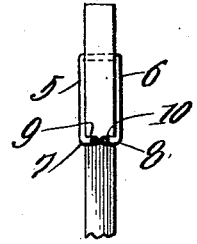
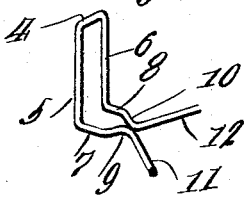
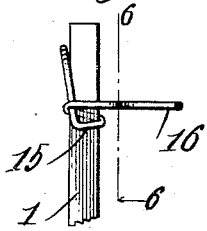
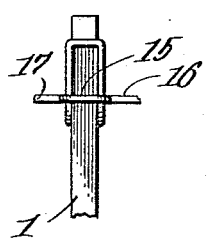
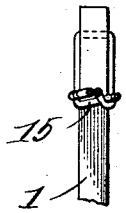
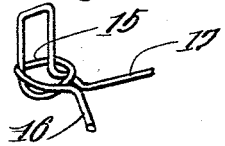
WITNESSES
Guy M. Sprung
Lloyd W. Patch
INVENTOR
S Spencer Eccleston
BY Richard B. Owen.
ATTORNEY

UNITED STATES PATENT OFFICE.

S SPENCER ECCLESTON, OF CORTLAND, NEW YORK.

PLANT-SUPPORT.

1,286,258.   Specification of Letters Patent.   Patented Dec. 3, 1918.

Application filed December 7, 1917. Serial No. 206,043.

*To all whom it may concern:*

Be it known that I, S SPENCER ECCLESTON, a citizen of the United States, residing at Cortland, in the county of Cortland and State of New York, have invented certain new and useful Improvements in Plant-Supports, of which the following is a specification.

This invention relates to an improved plant support, and it is a purpose of my invention to provide a structure of this character which may be used in bunching up and supporting shrubs, and plants of various characters, and which device is of such character that it may be placed for use in conjunction with fruit bearing shrubs or plants, and will elevate and support the fruit to be held out of contact with the ground and at such an elevation that free circulation of air therearound is allowed.

A further object is to so construct the part of the support that adjustment of the height of elevation of the holding or supporting means can be made to suit various conditions of use and when once the adjustment has been obtained, the parts will be retained automatically secured in the proper adjustment through the bearing and weight of the plants or shrubs thereon.

A still further object is to construct the holding or supporting means in the form of an open ring which can be fitted around the branches of the shrub or plant and then connected together, thus providing for ready application of the support for use and removal of the same.

Yet another object is to associate with the holding or supporting ring, a stake on which the ring is mounted and along the length of which the ring is adjustable, the mounting of the ring upon the stake being such that the ring binds on the stake to hold it itself in various adjusted positions, and at the same time is held against twisting or wabbling in case the weight or bearing of the plant upon the ring be unevenly distributed.

With the above and other objects in view, which will be in part described and in part understood from the specification, drawings, and claim, my invention consists in certain novel features of construction and combination of parts which will be hereinafter more clearly set forth.

In the drawings:—

Figure 1 is a view in perspective showing the device of my invention as it would be applied in use;

Fig. 2 is a fragmentary view of the upper end of the supporting stake and with portions of the supporting wire shown associated therewith;

Fig. 3 is a fragmentary perspective view to better illustrate the manner of forming the stake receiving loop of the supporting wire;

Fig. 4 is a detail view showing a slightly modified form which may be given to the stake receiving portion of the supporting wire;

Fig. 5 is a view of the structure shown in Fig. 4 and viewed from a different angle;

Fig. 6 is a view of the parts as disclosed in Fig. 4 and taken substantially on the section line 6—6; and, Fig. 7 is a perspective view of the stake receiving portion of the wire as illustrated in Fig. 4.

In the present instance I have shown the supporting stake 1 as being made square or substantially rectangular in cross-section, although as the description progresses it will be noted that with only slight modifications of the structure a stake substantially round, or of other configuration in cross-section might be used. This stake 1 has one end thereof pointed as indicated at 2 so that it may be more readily driven into the earth adjacent the shrub or plant to be supported.

The plant supporting member proper, is made up from a single length of wire which is bent and shaped to the proper form and it will be unnderstood that this wire will be of sufficiently heavy gage to bear up and withstand the strain which will be placed thereon in use. A single stretch of wire 3 is bent to form a supporting loop at its center to embrace the stake, and two substantially semi-circular bows to make a ring which supports the plant. The loop is made up of a cross bar 4, two side arms 5 and 6 standing parallel with each other and leading obliquely downward from the cross bar and then bent at an obtuse angle and carried horizontally forward at 7 and 8 respectively alongside the stake 1, and then bent inward into contact with each other in jaws 9 and 10 as best seen in Fig. 3, which jaws stand against the front of the stake or that side toward the plant. From these jaws these stretches of wire are bent outward into two bows 11 and 12 respectively, having 1,286,258 hooks 13 and 14 at their extremities which may be engaged with each other as best seen in Fig. 1.

In use, the stake is first driven into the ground adjacent the plant, bows hooked to each other at one end so as to loosen the loop, and the loop passed over the stake and slipped down to the ground while the bows are open. They are then drawn together and hooked at 13 and 14, and the loop is slipped up the stake the rings moves up around the plant, so slipping the loop upward, the contacting jaws 4 and 10 ride along the inner face of the stake, forward bent portions 5 and 8 and the whole of the arms 4 and 6 ride along the sides of the stake, the cross bars 11 and 12 along the face of the stake and when pressure comes to a stop only certain specific embodiments of the Fig. 7, the loop serves to hold the ring substantially horizontal and to inclose the plant. Attention is invited to the obtuse angle on each side by standing against one side of the post. Also as seen in the near of the side arms 4 and 56 and Fig. 7 the inclined portion 5 leads obliquely downward along the side of the post to this angle and the horizontal portion extends thence forward then the front of the post. It is obvious that the side of the loop has contact with the post along two distinct lines, and that the use of the loop on the post is thus fully obviated.

In Figs. 6, 7 and I have illustrated a slightly modified form of the support, and in this adaptation the inclination of the wire is disposed slightly different so as that the under face of one of the side arms is formed substantially rectangular in cross section from the cross bar 12 being round as indicated at 15 at one entire embrace and encircles the stake, the wire then being extended at this end to form the plant embracing bow 16, while the remainder is bent outwardly and bowed to form the plant embracing bow 17. To all intents and purposes the holding action obtained in the use of the modified form of the device is substantially identical with that obtained in the use of the forms shown in Figs. 2 and 3, although the modified construction may perhaps better adapt itself for use where heavy plants or shrubs are to be supported.

From the above description of the device and the manner of using the same, it will be seen that I have provided a plant support which can be readily fitted into position for use and as readily removed, which can be manufactured and sold at small cost, and which can be stored compactly in very small space when not in use and can be thus held over from one season to another for reuse. While then the foregoing I have described only certain specific embodiments of the present invention, it is to be understood that in practice I do not limit myself to such specific details but may resort to any practical modifications falling within the scope of the invention as defined in the appended claim.

Claim:—

In a plant support, combination with a stake of rectangular cross section, of the support proper made of a single stretch of wire bent at its mid length into a link having two arms obliquely downward alongside the stake and bent horizontally forward alongside the stake, jaws formed by bending the horizontal portions inward that the front of the stake into contact with each other, and the stretches of wire diverging from the jaws forward into bows having hooks at their ends, for the purpose set forth.

In testimony whereof I affix my signature in presence of two witnesses.

S SPENCER ECCLESTON.

Witnesses:
WILLIAM FORREST,
Mrs. D. W. P. PALMER.